Patented June 16, 1936

2,044,016

UNITED STATES PATENT OFFICE 2,044,016

AMINO-ALKOXY-BENZAMIDES AND PROCESS OF PREPARING THE SAME

Robert L. Perkins, East Aurora, N. Y., assignor to National Aniline & Chemical Company, Inc., New York, N. Y., a corporation of New York No Drawing. Application December 5, 1933, Serial No. 701,051

8 Claims. (Cl. 260—124)

This invention relates to the preparation of new benzamide compounds and is especially directed to amino-alkoxy-(or aralkoxy)-benzamides and to their preparation and uses. More particularly, the 2-amino-4-alkoxy-(or aralkoxy)-benzamides and homologues thereof are within the purview of the present application. The general structure of these compounds may be represented by the following general formula

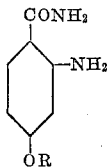

wherein R represents an alkyl or aralkyl group.

This application is further directed to the preparation of the above benzamide compounds from the nitro-alkoxy-(or aralkoxy)-benzonitrile or amino-alkoxy-(or aralkoxy)-benzonitrile compounds described and claimed in application, Serial No. 701,050, of Robert L. Perkins and Alvin J. Sweet, filed of even date herewith.

The 2-amino-4-alkoxy-(or aralkoxy)-benzamides are colorless crystalline bodies, sparingly soluble in cold water, more soluble in hot water, and fairly soluble in ethyl alcohol and other organic solvents.

They are especially useful as intermediates in the manufacture of dyestuffs.

The compounds of this invention may be prepared from the 2-nitro-4-alkoxy-(or aralkoxy)-benzonitriles by subjecting them to limited hydrolysis and reduction. The complete hydrolysis of the benzonitriles results in the formation of benzoic acids, so that by continuing the hydrolytic reaction of the present invention, such benzoic acids may be prepared without first isolating the corresponding benzamides. The water-soluble sulfides, such as alkali-metal sulfides and polysulfides, including ammonium sulfides and polysulfides, are especially suitable reagents for the preparation of the benzamides of this invention because they serve to promote the hydrolysis of the —CN group to —CONH$_2$ and at the same time effect the reduction of the —NO$_2$ group to an —NH$_2$ group. The hydrolysis may be effected merely by heating the sulfide or polysulfide with the benzonitrile. Preferably the nitrile is added to the sulfide, as higher yields are obtainable by this procedure than by adding the sulfide to the nitrile. The reduction and hydrolysis may also be carried out as separate steps or reduction may be carried out during only a portion of the period of hydrolysis.

The following example illustrates one method of preparing my new compounds. Quantities are expressed as parts by weight. Example: To 100 parts of a 25% solution of sodium sulfide (Na$_2$S) maintained at 85° C. there is added slowly 5 parts of 2-nitro-4-ethoxy-benzonitrile. The temperature rises to about 90° C. during this addition and the mixture is maintained at 90° C. for a short time or until reduction and hydrolysis are substantially complete. The mixture is then cooled and the crystalline product is filtered off. Upon recrystallization from water, amino-ethoxy-benzamide having the probable formula

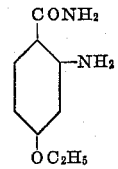

is obtained in the form of colorless plates which melt at 160 to 160.5° C. It is sparingly soluble in cold water, more soluble in hot water, readily soluble in ethyl alcohol, and somewhat soluble in benzene.

In the above example it has been specified that the nitrile is added to the sodium sulfide. It is, of course, possible to carry out the reaction by addition of the sodium sulfide to the nitrile, but in this case a poorer yield ordinarily is obtained.

The amino-alkoxy-(or aralkoxy)-benzamides may be hydrolyzed readily to amino-alkoxy-(or aralkoxy)-benzoic acids, for example the 2-amino-4-ethoxybenzamide prepared as described above may be hydrolyzed, by heating in the presence of aqueous NaOH, to 2-amino-4-ethoxybenzoic acid.

Although a temperature of 85 to 90° has been specified, the temperature may be varied considerably and is merely kept within practical limits since, if the reacting ingredients are maintained at a lower temperature, the rate of reduction and partial hydrolysis is diminished.

In similar manner the homologues of the above benzamide may be produced. Especially the ethoxy group of the above benzamide may be replaced by any other alkoxy-(or aralkoxy)-group, for example a methoxy-, propyloxy-, butyloxy-, benzyloxy-, methylbenzyloxy-group.

It will be evident from the above discussion that the 2-amino-4-alkoxy-(or aralkoxy)-benzamides may be prepared by the hydrolysis of 2-amino-4-alkoxy-(or aralkoxy)-benzonitriles and that they represent intermediate products in the formation of the corresponding benzoic acids by hydrolysis of such nitriles. This method of preparing the 2-amino-4-alkoxy-(or aralkoxy)-benzoic acids is therefore within the purview of the present invention regardless of whether or not the benzamide is first isolated.

I claim:

1. As a new compound 2-amino-4-ethoxy-benzamide.

2. The method of preparing 2-amino-4-ethoxy-benzamide, which comprises heating 2-nitro-4-ethoxy-benzonitrile with aqueous sodium sulfide.

3. The method of preparing 2-amino-4-ethoxy-benzamide, which comprises slowly adding 2-nitro-4-ethoxy-benzonitrile to an aqueous solution of sodium sulfide.

4. As a new benzamide compound the product of reaction of 2-nitro-4-ethoxy-benzonitrile and an aqueous alkali-metal sulfide, said product having a melting point of about 160° C. and being sparingly soluble in cold water, soluble in hot water, and soluble in ethyl alcohol.

5. As a new compound a benzamide having the formula

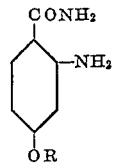

wherein R represents an alkyl or aralkyl group.

6. As a new compound a member of the group consisting of 2-amino-4-alkoxy and 2-amino-4-aralkoxy-benzamides and homologues thereof.

7. The method of preparing a benzamide compound, which comprises hydrolyzing a 2-amino-4-alkoxy or 2-amino-4-aralkoxy benzonitrile or a homologue thereof.

8. The method of preparing a benzamide compound, which comprises treating a 2-nitro-4-alkoxy or 2-nitro-4-aralkoxy benzonitrile or a homologue thereof with an aqueous alkali-metal sulfide.

ROBERT L. PERKINS.